United States Patent
Ziegler et al.

(10) Patent No.: US 9,567,461 B2
(45) Date of Patent: Feb. 14, 2017

(54) POLY(PHENYLENE ETHER) COMPOSITION AND ARTICLE

(71) Applicant: SABIC Global Technologies B.V., Bergen op Zoom (NL)

(72) Inventors: Christopher Ziegler, Selkirk, NY (US); Kim G. Balfour, Selkirk, NY (US); Mark Victor Vendon, Selkirk, NY (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 15/109,739

(22) PCT Filed: Dec. 16, 2014

(86) PCT No.: PCT/US2014/070468
§ 371 (c)(1),
(2) Date: Jul. 5, 2016

(87) PCT Pub. No.: WO2015/108646
PCT Pub. Date: Jul. 23, 2015

(65) Prior Publication Data
US 2016/0326368 A1    Nov. 10, 2016

Related U.S. Application Data

(60) Provisional application No. 61/929,314, filed on Jan. 20, 2014.

(51) Int. Cl.
*C08L 71/12* (2006.01)

(52) U.S. Cl.
CPC .......... *C08L 71/123* (2013.01); *C08L 2205/03* (2013.01); *C08L 2205/06* (2013.01)

(58) Field of Classification Search
CPC .. C08L 71/123; C08L 2205/03; C08L 2205/06
USPC ........................................................ 524/359
See application file for complete search history.

(56) References Cited

U.S. PATENT DOCUMENTS

| | | |
|---|---|---|
| 2003/0181584 A1 | 9/2003 | Handlin, Jr. et al. |
| 2005/0154100 A1 | 7/2005 | Kosaka et al. |
| 2006/0079642 A1 | 4/2006 | Adedeji et al. |
| 2007/0112132 A1 | 5/2007 | Zhao et al. |
| 2008/0113138 A1 | 5/2008 | Pecak et al. |
| 2010/0139944 A1 | 6/2010 | Guo et al. |
| 2012/0308753 A1 | 12/2012 | Balfour |
| 2013/0078502 A1 | 3/2013 | Riding |
| 2013/0280532 A1 | 10/2013 | Balfour et al. |

FOREIGN PATENT DOCUMENTS

WO    2009069042 A1    6/2009

OTHER PUBLICATIONS

International Search Report mailed Mar. 31, 2015; International Application No. PCT/US2014/070468; International Filing Date Dec. 16, 2014 (4 pages).
Written Opinion mailed Mar. 31, 2015; International Application No. PCT/US2014/070468; International Filing Date Dec. 16, 2014 (5 pages).
International Search Report mailed Mar. 31, 2015, International Application No. PCT/US2014/070470; International Filing Date Dec. 16, 2014 (4 pages).
Written Opinion mailed Mar. 31, 2015, International Application No. PCT/US2014/070470; International Filing Date Dec. 16, 2014 (6 pages).

*Primary Examiner* — Angela C Scott
(74) *Attorney, Agent, or Firm* — Cantor Colburn LLP

(57) ABSTRACT

A composition is prepared by melt blending specific amounts of components including a poly(phenylene ether), a first hydrogenated block copolymer (HBC1) that includes a polystyrene-poly(ethylene-butylene)-polystyrene triblock copolymer having a polystyrene content of 50 to 75 weight percent, and a second hydrogenated block copolymer. The second hydrogenated block copolymer can selected from five different hydrogenated block copolymer types and their combinations. The composition exhibits high light transmittance, low haze, and high impact strength at low temperature, which make it useful for molding objects such as containers for storage in refrigerators and freezers.

20 Claims, No Drawings

POLY(PHENYLENE ETHER) COMPOSITION AND ARTICLE

CROSS REFERENCE TO RELATED APPLICATIONS

This application is a National Stage application of PCT/US2014/070468, filed Dec. 16, 2014, which claims the benefit of U.S. Provisional Application No. 61/929,314, filed Jan. 20, 2014, both of which are incorporated by reference in their entirety herein.

BACKGROUND OF THE INVENTION

Plastic articles used for refrigerated storage require low temperature impact strength to reduce fractures during impact events. Impact strength of plastics generally decreases with decreasing temperature. U.S. Patent Application Publication No. US 2012/0308753 A1 of Balfour et al. describes poly(phenylene ether) compositions exhibiting a desirable combination of optical clarity and impact strength at ambient temperature, but their impact strength is sometimes inadequate for use in low temperature environments. There remains a need for poly(phenylene ether) compositions exhibiting optical clarity and improved low temperature impact strength. In particular, there is a need for poly(phenylene ether) compositions exhibiting a transmittance of at least 60 percent, a correlated haze less than or equal to 20 percent, and a −20° C. multiaxial impact energy to failure of at least 20 joules.

BRIEF SUMMARY OF EMBODIMENTS OF THE INVENTION

One embodiment is a composition comprising the product of melt blending components comprising: 29 to 95.5 weight percent of a poly(phenylene ether); 4 to 50 weight percent of a first hydrogenated block copolymer comprising a polystyrene-poly(ethylene-butylene)-polystyrene triblock copolymer having a polystyrene content of 50 to 75 weight percent; and a second hydrogenated block copolymer (HBC2) comprising (HBC2a) 0.5 to 18 weight percent of a polystyrene-poly(ethylene-butylene-styrene)-polystyrene triblock copolymer having a polystyrene content of 50 to 65 weight percent and a weight average molecular weight of 200,000 to 400,000 atomic mass units, wherein the first hydrogenated block copolymer and the second hydrogenated block copolymer are present in a weight ratio of 1:1 to 15:1;

(HBC2b) 2 to 10 weight percent of a polystyrene-poly(ethylene-butylene-styrene)-polystyrene triblock copolymer having a polystyrene content of 55 to 65 weight percent and a weight average molecular weight of 100,000 to 190,000 atomic mass units, wherein the first hydrogenated block copolymer and the second hydrogenated block copolymer are present in a weight ratio of 2:1 to 4:1, and wherein the melt blended components further comprise 0.2 to 1.5 weight percent of a $C_3$-$C_{24}$ alpha-hydroxyketone;

(HBC2c) 1 to 5 weight percent of a polystyrene-poly(ethylene-butylene-styrene)-polystyrene triblock copolymer having a polystyrene content of 33 to 47 weight percent, wherein the second hydrogenated block copolymer and the first hydrogenated block copolymer are present in a weight ratio of 2:1 to 15:1;

(HBC2d) 1 to 20 weight percent of a polystyrene-poly(ethylene-butylene)-polystyrene triblock copolymer having a polystyrene content of 20 to 37 weight percent and a weight average molecular weight of 50,000 to 200,000 atomic mass units, wherein the second hydrogenated block copolymer and the first hydrogenated block copolymer are present in a weight ratio of 2:1 to 7:1; provided that when the first hydrogenated block copolymer amount is greater than or equal to 10 weight percent, the weight ratio of the second hydrogenated block copolymer and the first hydrogenated block copolymer is less than 5:1; or (HBC2e) 0.5 to 15 weight percent of a polystyrene-poly(ethylene-butylene)-polystyrene triblock copolymer having a polystyrene content of 38 to 48 weight percent, wherein the first hydrogenated block copolymer and the second hydrogenated block copolymer are present in a weight ratio of 1.25:1 to 25:1 wherein the melt blended components further comprise 0.2 to 0.7 weight percent of a $C_3$-$C_{24}$ alpha-hydroxyketone, provided that when the amount of the polystyrene-poly(ethylene-butylene)-polystyrene triblock copolymer having a polystyrene content of 38 to 48 weight percent is 0.5 weight percent, the amount of the first hydrogenated block copolymer is greater than 5 weight percent, and provided that the sum of the first hydrogenated block copolymer and the polystyrene-poly(ethylene-butylene)-polystyrene triblock copolymer having a polystyrene content of 38 to 48 weight percent is less than 46 weight percent;

wherein the melt blended components comprise 0 to 0.5 weight percent polyolefins.

Another embodiment is an article comprising the composition.

These and other embodiments are described in detail below.

DETAILED DESCRIPTION OF THE INVENTION

The present inventors have determined that the combination of a transmittance of at least 60 percent, a correlated haze less than or equal to 20 percent, and a −20° C. multiaxial impact energy to failure of at least 20 joules is exhibited by a composition that includes specific amounts of a poly(phenylene ether), a first hydrogenated block copolymer (HBC1) and a second hydrogenated block copolymer (HBC2). Five chemically distinct types of second hydrogenated block copolymer—designated HBC2a through HBC2e—are suitable, each being used in a different combination of amount and ratio with the first hydrogenated block copolymer. The composition's combination of high transmittance, low haze, and high impact strength at −20° C. makes it useful for molding articles exposed to low temperatures during use, such as storage containers for refrigerators and freezers.

One embodiment is a composition comprising the product of melt blending components comprising: 29 to 95 weight percent of a poly(phenylene ether); 4 to 50 weight percent of a first hydrogenated block copolymer comprising a polystyrene-poly(ethylene-butylene)-polystyrene triblock copolymer having a polystyrene content of 50 to 75 weight percent; and a second hydrogenated block copolymer (HBC2) comprising (HBC2a) 0.5 to 18 weight percent of a polystyrene-poly(ethylene-butylene-styrene)-polystyrene triblock copolymer having a polystyrene content of 50 to 65 weight percent and a weight average molecular weight of 200,000 to 400,000 atomic mass units, wherein the first hydrogenated block copolymer and the second hydrogenated block copolymer are present in a weight ratio of 1:1 to 15:1;

(HBC2b) 2 to 10 weight percent of a polystyrene-poly(ethylene-butylene-styrene)-polystyrene triblock copolymer having a polystyrene content of 55 to 65 weight percent and a weight average molecular weight of 100,000 to 190,000 atomic mass units, wherein the first hydrogenated block copolymer and the second hydrogenated block copolymer are present in a weight ratio of 2:1 to 4:1, and wherein the melt blended components further comprise 0.2 to 1.5 weight percent of a $C_3$-$C_{24}$ alpha-hydroxyketone;

(HBC2c) 1 to 5 weight percent of a polystyrene-poly(ethylene-butylene-styrene)-polystyrene triblock copolymer having a polystyrene content of 33 to 47 weight percent, wherein the second hydrogenated block copolymer and the first hydrogenated block copolymer are present in a weight ratio of 2:1 to 15:1;

(HBC2d) 1 to 20 weight percent of a polystyrene-poly(ethylene-butylene)-polystyrene triblock copolymer having a polystyrene content of 20 to 37 weight percent and a weight average molecular weight of 50,000 to 200,000 atomic mass units, wherein the second hydrogenated block copolymer and the first hydrogenated block copolymer are present in a weight ratio of 2:1 to 7:1; provided that when the first hydrogenated block copolymer amount is greater than or equal to 10 weight percent, the weight ratio of the second hydrogenated block copolymer and the first hydrogenated block copolymer is less than 5:1; or (HBC2e) 0.5 to 15 weight percent of a polystyrene-poly(ethylene-butylene)-polystyrene triblock copolymer having a polystyrene content of 38 to 48 weight percent, wherein the first hydrogenated block copolymer and the second hydrogenated block copolymer are present in a weight ratio of 1.25:1 to 25:1 wherein the melt blended components further comprise 0.2 to 0.7 weight percent of a $C_3$-$C_{24}$ alpha-hydroxyketone, provided that when the amount of the polystyrene-poly(ethylene-butylene)-polystyrene triblock copolymer having a polystyrene content of 38 to 48 weight percent is 0.5 weight percent, the amount of the first hydrogenated block copolymer is greater than 5 weight percent, and provided that the sum of the first hydrogenated block copolymer and the polystyrene-poly(ethylene-butylene)-polystyrene triblock copolymer having a polystyrene content of 38 to 48 weight percent is less than 46 weight percent;

wherein the melt blended components comprise 0 to 0.5 weight percent polyolefins.

The composition generally exhibits a correlated haze value less than or equal to 20%, a transmittance value greater than or equal to 60%, and a −20° C. multiaxial impact energy to failure value greater than or equal to 20 joules, wherein correlated haze and transmittance are determined at a sample thickness of 3.175 millimeters. Correlated haze and transmittance measurements were determined using 3.175 millimeter (0.125 inch) thick ASTM Dynatup disks and measured on a Gretag Macbeth Color-Eye™ 7000A spectrophotometer. The transmittance values correspond to Y tri-stimulus values for the 1931 CIE XYZ color space. Multiaxial impact energy to failure values were determined at −20° C. according to ASTM D 3763-10 using a test speed of 3.3 meters per second and a sample thickness of 3.175 millimeters. In some embodiments, the composition exhibits a correlated haze value of 2 to 20%, a transmittance value of 60 to 85%, and a −20° C. multiaxial impact energy to failure value of 20 to 75 joules. In some embodiments, the composition exhibits a correlated haze value of 3 to 10%, a transmittance value of 70 to 85%, and a −20° C. multiaxial impact energy to failure value of 50 to 75 joules.

The melt blended components include a poly(phenylene ether). Suitable poly(phenylene ether)s include those comprising repeating structural units having the formula

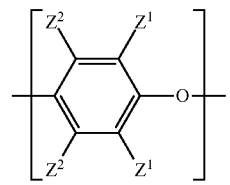

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.6 deciliter per gram, more specifically 0.35 to 0.55 deciliter per gram, even more specifically 0.4 to 0.5 deciliter per gram.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) comprises a poly(2,6-dimethyl-1,4-phenylene ether). In some embodiments, the poly(phenylene ether) comprises a poly(2,6-dimethyl-1,4-phenylene ether) having an intrinsic viscosity of 0.3 to 0.6 deciliter per gram, specifically 0.35 to 0.5 deciliter per gram, measured by Ubbelohde viscometer at 25° C. in chloroform.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a random copolymer, a block copolymer, a graft copolymer, or an ionomer, as well as combinations thereof.

The melt blended components comprise the poly(phenylene ether) in an amount of 29 to 95.5 weight percent, based on the total weight of the melt-blended components (which is equivalent to the total weight of the composition). Within this range, the poly(phenylene ether) amount can be 40 to 95 weight percent, specifically 60 to 95 weight percent, specifically 75 to 93 weight percent. Also, it will be understood that the upper limit of the poly(phenylene ether) amount is dictated by the minimum amounts of other components. So, the upper limit of 95.5 weight percent applies to the use of HBC2a and HBC2e in a minimum amount of 0.5 weight percent. An upper limit of 95 weight percent applies to the use of HBC2c and HBC2d in a minimum amount of 1 weight percent. And an upper limit of 94 weight percent applies to the use of HBC2b in a minimum amount of 2 weight percent.

In addition to the poly(phenylene ether), the melt blended components comprise a first hydrogenated block copolymer (HBC1) and a second hydrogenated block copolymer (HBC2), wherein the second hydrogenated block copolymer can be any of five types. The first hydrogenated block copolymer and the five types of second hydrogenated block copolymer are each distinguished from the others by molecular architecture (polystyrene-poly(ethylene-butylene)-polystyrene versus polystyrene-poly(ethylene-butylene-styrene)-polystyrene), polystyrene content, weight average molecular weight, or a combination of two or three of the foregoing. Where not specified by suppliers, molecular architecture and polystyrene content can be determined by $^1$H or $^{13}$C nuclear magnetic resonance spectroscopy, and weight average molecular weights can be determined by gel permeation chromatography using polystyrene standards. Methods of preparing hydrogenated block copolymers are known, and the skilled person can modify synthesis conditions to control molecular architecture, polystyrene content, and weight average molecular weight. Species of each type of hydrogenated block copolymer described herein are currently commercially available.

The first hydrogenated block copolymer (HBC1) comprises a polystyrene-poly(ethylene-butylene)-polystyrene triblock copolymer having a polystyrene content of 50 to 75 weight percent. Within this range, the polystyrene content of the first hydrogenated block copolymer can be 60 to 75 weight percent, specifically 62 to 72 weight percent. In some embodiments, HBC1 has a weight average molecular weight of 50,000 to 200,000 atomic mass units. Within this range, the HBC1 weight average molecular weight can be 50,000 to 150,000 atomic mass units, specifically 50,000 to 100,000 atomic mass units. In some embodiments, the first hydrogenated block copolymer consists of the polystyrene-poly(ethylene-butylene)-polystyrene triblock copolymer having a polystyrene content of 50 to 75 weight percent. In some embodiments, HBC1 comprises 10 to 20 weight percent of the polystyrene-poly(ethylene-butylene)-polystyrene triblock copolymer having a polystyrene content of 50 to 75 weight percent, and has a weight average molecular weight of 50,000 to 100,000 atomic mass units. An example of a first hydrogenated block copolymer is TUFTEC™ H1043 Resin, available from Asahi Kasei Elastomer.

The melt blended components comprise the first hydrogenated block copolymer in an amount of 4 to 50 weight percent, based on the total weight of the melt blended components. Within this range, the amount of first hydrogenated block copolymer can be 5 to 50 weight percent, specifically 7 to 30 weight percent, specifically 10 to 20 weight percent.

As noted above, there are five types of second hydrogenated block copolymers. The first of these, designated HBC2a, is a polystyrene-poly(ethylene-butylene-styrene)-polystyrene triblock copolymer having a polystyrene content of 50 to 65 weight percent and a weight average molecular weight of 200,000 to 400,000 atomic mass units. The polystyrene-poly(ethylene-butylene-styrene)-polystyrene triblock copolymer is a tapered block copolymer, also known as a controlled distribution block copolymer. Synthesis of such copolymers is described, for example, in U.S. Patent Application Publication No. US 2003/0181584 A1 of Handlin et al. Within the range of 50 to 65 weight percent, the polystyrene content can be 52 to 63 weight percent, specifically 54 to 61 weight percent, based on the weight of HBC2a. Within the range of 200,000 to 400,000 atomic mass units, the weight average molecular weight can be 200,000 to 300,000 atomic mass units. An example of a commercially available HBC2a is KRATON™ A1535, available from Kraton Performance Polymers.

When utilized as one of the melt blended components, HBC2a is used in an amount of 0.5 to 18 weight percent, based on the total weight of melt blended components. Within this range, the HBC2a amount can be 1 to 10 weight percent, specifically 1 to 5 weight percent, more specifically 1 to 3 weight percent. In order to achieve the desired optical and ductile properties, the weight ratio of HBC1 to HBC2a is 1:1 to 15:1. Within this range, the weight ratio can be 1.5:1 to 15:1, specifically 5:1 to 14:1.

The next type of second hydrogenated block copolymer, designated HBC2b, is a polystyrene-poly(ethylene-butylene-styrene)-polystyrene triblock copolymer having a polystyrene content of 55 to 65 weight percent and a weight average molecular weight of 100,000 to 190,000 atomic mass units. Within the range of 55 to 65 weight percent, the polystyrene content can be 57 to 63 weight percent, based on the weight of HBC2b. Within the range of 100,000 to 190,000 atomic mass units, the weight average molecular weight can be 140,000 to 180,000 atomic mass units. An example of a commercially available HBC2b is KRATON™ A1537, available from Kraton Performance Polymers.

When utilized as one of the melt blended components, HBC2b is used in an amount of 2 to 10 weight percent, based on the total weight of melt blended components. Within this range, the HBC2b amount can be 2 to 8 weight percent, specifically 2 to 6 weight percent. In order to achieve the desired optical and ductile properties, the weight ratio of HBC1 to HBC2b is 2:1 to 4:1. Within this range, the weight ratio can be 3:1 to 4:1.

When HBC2b is one of the melt blended components, it is used in combination with 0.2 to 1.5 weight percent of a $C_3$-$C_{24}$ alpha-hydroxyketone to achieve the desired haze and transmittance. Examples of $C_3$-$C_{24}$ alpha-hydroxyketones include hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone, CAS Reg. No. 119-53-9), 2-hydroxy-1-phenyl-2-p-tolyl-ethanone (CAS Reg. No. 2431-02-9), and combinations thereof. In some embodiments, the $C_3$-$C_{24}$ alpha-hydroxyketone comprises benzoin. Within the range of 0.2 to 1.5 weight percent, the $C_3$-$C_{24}$ alpha-hydroxyketone amount can be 0.2 to 1 weight percent, specifically 0.3 to 0.6 weight percent, based on the total weight of the melt blended components.

The next type of second hydrogenated block copolymer, designated HBC2c, is a polystyrene-poly(ethylene-butylene-styrene)-polystyrene triblock copolymer having a polystyrene content of 33 to 47 weight percent. Within the range of 33 to 47 weight percent, the polystyrene content can be 34 to 46 weight percent, specifically 35 to 45 weight percent, based on the weight of HBC2c. An example of a commercially available HBC2c is KRATON™ A1536, available from Kraton Performance Polymers. In some embodiments, HBC2c has a weight average molecular weight of 100,000 to 200,000 atomic mass units, specifically 120,000 to 180,000 atomic mass units.

When utilized as one of the melt blended components, HBC2c is used in an amount of 1 to 5 weight percent, based on the total weight of melt blended components. Within this range, the HBC2c amount can be 1 to 4 weight percent, specifically 1 to 3 weight percent. In order to achieve the desired optical and ductile properties, the ratio of HBC1 to HBC2c is 2:1 to 15:1. Within this range, the ratio can be 3:1 to 15:1, specifically 4:1 to 10:1.

The next type of second hydrogenated block copolymer, designated HBC2d, is a polystyrene-poly(ethylene-butylene)-polystyrene triblock copolymer having a polystyrene content of 20 to 37 weight percent and a weight average molecular weight of 50,000 to 200,000 atomic mass units. Within the range of 20 to 37 weight percent, the polystyrene content can be 25 to 35 weight percent, specifically 26 to 33 weight percent, based on the weight of HBC2d. Within the range of 50,000 to 200,000, the weight average molecular weight can be 70,000 to 150,000 atomic mass units. Examples of commercially available HBC2d include KRATON™ G1650 and KRATON™ G1652, available from Kraton Performance Polymers; CALPRENE™ H6120, available from Dynasol; SEPTON™ 8004, available from Kuraray; SEBS 9550 from LCY; and SEBS 6150 from TSRC.

When utilized as one of the melt blended components, HBC2d is used in an amount of 1 to 20 weight percent, based on the total weight of melt blended components. Within this range, the HBC2d amount can be 2 to 10 weight percent, specifically 2 to 6 weight percent. In order to achieve the desired optical and ductile properties, the ratio of HBC1 to HBC2d is 2:1 to 7:1. Within this range, the ratio can be 2:1 to 6:1, specifically 2.5:1 to 5:1. However, when the first hydrogenated block copolymer amount is greater than or equal to 10 weight percent, the weight ratio of HBC1 to HBC2d is less than 5:1.

The last type of second hydrogenated block copolymer, designated HBC2e, is a polystyrene-poly(ethylene-butylene)-polystyrene triblock copolymer having a polystyrene content of 38 to 48 weight percent. Within the range of 38 to 48 weight percent, the polystyrene content can be 38 to 46 weight percent, specifically 39 to 46 weight percent, based on the weight of HBC2e. In some embodiments, HBC2e has a weight average molecular weight of 50,000 to 150,000 atomic mass units. Within this range, the weight average molecular weight can be 70,000 to 120,000 atomic mass units. An example of a commercially available HBC2e is TUFTEC™ H1051, available from Asahi Kasei Elastomers.

When utilized as one of the melt blended components, HBC2e is used in an amount of 0.5 to 15 weight percent, based on the total weight of melt blended components. Within this range, the HBC2e amount can be 2 to 15 weight percent, specifically 6 to 14 weight percent. In order to achieve the desired optical and ductile properties, the ratio of HBC1 to HBC2e is 1.25:1 to 25:1. Within this range, the ratio can be 1.25:1 to 10:1, specifically 2.5:1 to 5:1.

When HBC2e is one of the melt blended components, it is used in combination with 0.2 to 0.7 weight percent of a $C_3$-$C_{24}$ alpha-hydroxyketone to achieve the desired haze and transmittance. Within this range, the $C_3$-$C_{24}$ alpha-hydroxyketone amount can be 0.3 to 0.6 weight percent. However, when the amount of HBC2e is 0.5 weight percent, the amount of HBC1 is greater than 5 weight percent. Also, the sum of HBC1 and HBC2e is less than 46 weight percent.

While HBC2a, HBC2b, HBC2c, HBC2d, and HBC2e have been described as being used one at a time, it will be understood that combinations of two or more of these second block copolymers can be used.

The melt blended components comprise 0 to 0.5 weight percent polyolefins. In some embodiments, polyolefins are excluded. As used herein, polyolefins refers to polymers that are the polymerization product of monomers consisting of $C_2$-$C_{20}$ olefins.

As described above, use of HBC2b or HBC2e is accompanied by use of a $C_3$-$C_{24}$ alpha-hydroxyketone to achieve the desired haze and transmittance. The $C_3$-$C_{24}$ alpha-hydroxyketone can also, optionally, be used in combination with HBC2a, HBC2c, or HBC2d. When present, the $C_3$-$C_{24}$ alpha-hydroxyketone is used in an amount of 0.2 to 1.5 weight percent, specifically 0.2 to 1 weight percent, more specifically 0.3 to 0.6 weight percent, based on the total weight of the melt blended components. In some embodiments, the $C_3$-$C_{24}$ alpha-hydroxyketone is benzoin.

The melt blended components can, optionally, further include a hydrocarbon resin. As used herein, the term "hydrocarbon resin" refers to aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, terpene resins, hydrogenated terpene resins, terpene-phenol resins, rosins, hydrogenated rosins, rosin esters, hydrogenated rosin esters, or a combination thereof. In some embodiments, the hydrocarbon resin has a softening point of 120 to 155° C. When present, such resins can be used in an amount of 1 to 15 weight percent, based on the total weight of the melt blended components. Alternatively, hydrocarbon resins can be minimized or excluded. Thus, in some embodiments, the melt-blended components comprise 0 to 1 weight percent of hydrocarbon resins. In some embodiments, the melt-blended components exclude hydrocarbon resins.

The melt blended components can, optionally, further comprise one or more additives known in the thermoplastics art. For example, the melt blended components can, optionally, further comprise an additive chosen from stabilizers, mold release agents, lubricants, processing aids, flame retardants, drip retardants, nucleating agents, UV blockers, dyes, pigments, antioxidants, anti-static agents, blowing agents, mineral oil, metal deactivators, antiblocking agents, and combinations thereof. When present, such additives are used in an amount that does not substantially detract from the desired transmittance, haze, and low temperature multiaxial impact properties of the composition. The total amount of all additives is typically less than or equal to 5 weight percent, specifically less than or equal to 2 weight percent, more specifically less than or equal to 1 weight percent, based on the total weight of the melt blended components. Any or all of these additives can, optionally, be excluded from the melt blended components. To the extent that an additive can be considered a polyolefin, its amount is limited by the general requirement that the melt blended components comprise 0 to 0.5 weight percent polyolefins.

The melt blended components can, optionally, minimize or exclude components other than those described above. For example, in some embodiments, the melt-blended components comprise 0 to 1 weight percent of ethylenically unsaturated rubber. Ethylenically unsaturated rubbers include polybutadiene and polyisoprene, and contributions to their amount can come from the respective homopolymers, random copolymers (e.g., with styrene, or with styrene and acrylonitrile), graft copolymers (e.g., rubber-modified polystyrenes, also known as high-impact polystyrenes), and block copolymers (e.g., unhydrogenated and partially hydrogenated block copolymers of butadiene and styrene and of isoprene and styrene). In some embodiments, the melt-blended components exclude ethylenically unsaturated rubber.

Another component that can be minimized or excluded is homopolystyrene. Thus, in some embodiments, the melt-blended components comprise 0 to 2 weight percent, specifically 0 to 1 weight percent of homopolystyrenes, including atactic homopolystyrenes, isotactic homopolystyrenes, syndiotactic homopolystyrenes, and combinations thereof. In some embodiments, melt-blended components exclude homopolystyrenes.

Another component that can be minimized or excluded is radial block copolymers of an alkenyl aromatic monomer and a conjugated diene. Thus, in some embodiments, the melt-blended components comprise 0 to 1 weight percent of radial block copolymers of an alkenyl aromatic monomer and a conjugated diene. In some embodiments, the melt-blended components exclude radial block copolymers of an alkenyl aromatic monomer and a conjugated diene.

Another component that can be minimized or excluded is polystyrene-poly(ethylene-butylene)-polystyrene triblock copolymers having a weight average molecular weight greater than 200,000 atomic mass units. As demonstrated in the working example below, such triblock copolymers can detract from the desired properties of the composition. In some embodiments, the melt-blended components comprise 0 to 1 weight percent of polystyrene-poly(ethylene-butylene)-polystyrene triblock copolymers having a weight average molecular weight greater than 200,000 atomic mass units. In some embodiments, the melt-blended components exclude polystyrene-poly(ethylene-butylene)-polystyrene triblock copolymers having a weight average molecular weight greater than 200,000 atomic mass units.

Another component that can be minimized or excluded is fillers, including reinforcing fillers (such as glass fibers, talc, and mica) and nonreinforcing fillers (such as silica and alumina), which tend to reduce transmittance and increase haze. Thus, in some embodiments, the melt blended components comprise 0 to 1 weight percent of fillers. In some embodiments, the melt blended components exclude fillers.

In some embodiments, the melt blended components exclude polyamides. In some embodiments, the melt blended components exclude polyesters.

In some embodiments, particularly embodiments in which the composition is used to mold food and beverage containers, the melt-blended components comprise 0 to 1 weight percent of organophosphate esters. In some embodiments, the melt-blended components exclude organophosphate esters. In some embodiments, the melt-blended components exclude flame retardants.

In a very preferred embodiment of the composition, the poly(phenylene ether) comprises a poly(2,6-dimethyl-1,4-phenylene ether) having an intrinsic viscosity of 0.3 to 0.6 deciliter per gram, measured at 25° C. in chloroform; the first hydrogenated block copolymer has a polystyrene content of 60 to 75 weight percent and a weight average molecular weight of 50,000 to 100,000 atomic mass units; the second hydrogenated block copolymer comprises (HBC2a) the polystyrene-poly(ethylene-butylene-styrene)-polystyrene triblock copolymer having a polystyrene content of 50 to 65 weight percent and a weight average molecular weight of 200,000 to 400,000 atomic mass units, and the first hydrogenated block copolymer and the second hydrogenated block copolymer are present in a weight ratio of 5:1 to 14:1; the melt blended components further comprise benzoin; and the melt-blended components comprise 75 to 85 weight percent of the poly(phenylene ether), 10 to 20 weight percent of the first hydrogenated block copolymer, 1 to 5 weight percent of the second hydrogenated block copolymer, and 0.3 to 0.6 weight percent of the benzoin.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 270 to 310° C., specifically 280 to 300° C.

The composition is useful for molding articles, particularly containers for refrigerated storage. The containers can be food or beverage containers. And the temperature of the refrigerated storage can be, for example, 10 to −20° C. The high transmittance and low haze of the composition facilitates the identification of container contents, and the high impact strength at low temperature reduces breakage in the event of accidental drops or other impacts. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

The invention includes at least the following embodiments.

Embodiment 1

A composition comprising the product of melt blending components comprising: 29 to 95.5 weight percent of a poly(phenylene ether); 4 to 50 weight percent of a first hydrogenated block copolymer (HBC1) comprising a polystyrene-poly(ethylene-butylene)-polystyrene triblock copolymer having a polystyrene content of 50 to 75 weight percent; and a second hydrogenated block (HBC2) copolymer comprising (HBC2a) 0.5 to 18 weight percent of a polystyrene-poly(ethylene-butylene-styrene)-polystyrene triblock copolymer having a polystyrene content of 50 to 65 weight percent and a weight average molecular weight of 200,000 to 400,000 atomic mass units, wherein the first hydrogenated block copolymer and the second hydrogenated block copolymer are present in a weight ratio of 1:1 to 15:1;

(HBC2b) 2 to 10 weight percent of a polystyrene-poly(ethylene-butylene-styrene)-polystyrene triblock copolymer having a polystyrene content of 55 to 65 weight percent and a weight average molecular weight of 100,000 to 190,000 atomic mass units, wherein the first hydrogenated block copolymer and the second hydrogenated block copolymer are present in a weight ratio of 2:1 to 4:1, and wherein the melt blended components further comprise 0.2 to 1.5 weight percent of a $C_3$-$C_{24}$ alpha-hydroxyketone;

(HBC2c) 1 to 5 weight percent of a polystyrene-poly(ethylene-butylene-styrene)-polystyrene triblock copolymer having a polystyrene content of 33 to 47 weight percent, wherein the second hydrogenated block copolymer and the first hydrogenated block copolymer are present in a weight ratio of 2:1 to 15:1;

(HBC2d) 1 to 20 weight percent of a polystyrene-poly(ethylene-butylene)-polystyrene triblock copolymer having a polystyrene content of 20 to 37 weight percent and a weight average molecular weight of 50,000 to 200,000 atomic mass units, wherein the second hydrogenated block copolymer and the first hydrogenated block copolymer are present in a weight ratio of 2:1 to 7:1, provided that when the first hydrogenated block copolymer amount is greater than or equal to 10 weight percent, the weight ratio of the second hydrogenated block copolymer and the first hydrogenated block copolymer is less than 5:1; or (HBC2e) 0.5 to 15 weight percent of a polystyrene-poly(ethylene-butylene)-polystyrene triblock copolymer having a polystyrene content of 38 to 48 weight percent, wherein the first hydrogenated block copolymer and the second hydrogenated block copolymer are present in a weight ratio of 1.25:1 to 25:1, wherein the melt blended components further comprise 0.2 to 0.7 weight percent of a $C_3$-$C_{24}$ alpha-hydroxyketone, provided that when the amount of the polystyrene-poly(ethylene-butylene)-polystyrene triblock copolymer having a polystyrene content of 38 to 48 weight percent is 0.5 weight percent, the amount of the first hydrogenated block copolymer is greater than 5 weight percent, and provided that the sum of the first hydrogenated block copolymer and the polystyrene-poly(ethylene-butylene)-polystyrene triblock copolymer having a polystyrene content of 38 to 48 weight percent is less than 46 weight percent;

wherein the melt blended components comprise 0 to 0.5 weight percent polyolefins.

Embodiment 2

The composition of embodiment 1, exhibiting a correlated haze value less than or equal to 20%, a transmittance value greater than or equal to 60%, and a −20° C. multiaxial impact energy to failure value greater than or equal to 20 joules, wherein correlated haze and transmittance are determined at a sample thickness of 3.175 millimeters.

Embodiment 3

The composition of embodiment 1 or 2, wherein the melt blended components further comprise 0.2 to 1.5 weight percent of the $C_3$-$C_{24}$ alpha-hydroxyketone when the second hydrogenated block copolymer comprises (HBC2a) the polystyrene-poly(ethylene-butylene-styrene)-polystyrene triblock copolymer having a polystyrene content of 50 to 65 weight percent and a weight average molecular weight of 200,000 to 400,000 atomic mass units, (HBC2c) the polystyrene-poly(ethylene-butylene-styrene)-polystyrene triblock copolymer having a polystyrene content of 33 to 47 weight percent, or (HBC2d) the polystyrene-poly(ethylene-butylene)-polystyrene triblock copolymer having a polystyrene content of 20 to 37 weight percent and a weight average molecular weight of 50,000 to 200,000 atomic mass units.

Embodiment 4

The composition of any of embodiments 1-3, wherein the melt blended components comprise 75 to 93 weight percent of the poly(phenylene ether).

Embodiment 5

The composition of any of embodiments 1-4, wherein the second hydrogenated block copolymer comprises (HBC2a) the polystyrene-poly(ethylene-butylene-styrene)-polystyrene triblock copolymer having a polystyrene content of 50 to 65 weight percent and a weight average molecular weight of 200,000 to 400,000 atomic mass units.

Embodiment 6

The composition of any of embodiments 1-4, wherein the second hydrogenated block copolymer comprises (HBC2b) the polystyrene-poly(ethylene-butylene-styrene)-polystyrene triblock copolymer having a polystyrene content of 55 to 65 weight percent and a weight average molecular weight of 100,000 to 190,000 atomic mass units.

Embodiment 7

The composition of any of embodiments 1-4, wherein the second hydrogenated block copolymer comprises (HBC2c) the polystyrene-poly(ethylene-butylene-styrene)-polystyrene triblock copolymer having a polystyrene content of 33 to 47 weight percent.

Embodiment 8

The composition of any of embodiments 1-4, wherein the second hydrogenated block copolymer comprises (HBC2d) the polystyrene-poly(ethylene-butylene)-polystyrene triblock copolymer having a polystyrene content of 20 to 37 weight percent and the weight average molecular weight of 50,000 to 200,000 atomic mass units.

Embodiment 9

The composition of any of embodiments 1-4, wherein the second hydrogenated block copolymer comprises (HBC2e) the polystyrene-poly(ethylene-butylene)-polystyrene triblock copolymer having a polystyrene content of 38 to 48 weight percent.

Embodiment 10

The composition of any of embodiments 1-9, wherein the first hydrogenated block copolymer has a weight average molecular weight of 50,000 to 200,000 atomic mass units.

Embodiment 11

The composition of any of embodiments 1-9, wherein the first hydrogenated block copolymer comprises 10 to 20 weight percent of the polystyrene-poly(ethylene-butylene)-polystyrene triblock copolymer having a polystyrene content of 50 to 75 weight percent, and has a weight average molecular weight of 50,000 to 100,000 atomic mass units.

Embodiment 12

The composition of any of embodiments 1-11, wherein the melt-blended components comprise 0 to 1 weight percent of ethylenically unsaturated rubber.

Embodiment 13

The composition of any of embodiments 1-12, wherein the melt-blended components comprise 0 to 2 weight percent of homopolystyrene.

Embodiment 14

The composition of any of embodiments 1-13, wherein the melt-blended components comprise 0 to 1 weight percent of radial block copolymers of an alkenyl aromatic monomer and a conjugated diene.

Embodiment 15

The composition of any of embodiments 1-14, wherein the melt-blended components comprise 0 to 1 weight percent of polystyrene-poly(ethylene-butylene)-polystyrene triblock copolymers having a weight average molecular weight greater than 200,000 atomic mass units.

Embodiment 16

The composition of any of embodiments 1-15, wherein the melt-blended components comprise 0 to 1 weight percent of hydrocarbon resins comprising aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, terpene resins, hydrogenated terpene resins, terpene-phenol resins, rosins, hydrogenated rosins, rosin esters, hydrogenated rosin esters, or a combination thereof.

Embodiment 17

The composition of any of embodiments 1-17, wherein the melt-blended components comprise 0 to 1 weight percent of organophosphate esters.

Embodiment 18

The composition of embodiment 1, wherein the poly(phenylene ether) comprises a poly(2,6-dimethyl-1,4-phenylene ether) having an intrinsic viscosity of 0.3 to 0.6 deciliter per gram, measured at 25° C. in chloroform; wherein the first hydrogenated block copolymer has a polystyrene content of 60 to 75 weight percent and a weight average molecular weight of 50,000 to 100,000 atomic mass units; wherein the second hydrogenated block copolymer comprises the polystyrene-poly(ethylene-butylene-styrene)-polystyrene triblock copolymer having a polystyrene content of 50 to 65 weight percent and a weight average molecular weight of 200,000 to 400,000 atomic mass units, and the first hydrogenated block copolymer and the second hydrogenated block copolymer are present in a weight ratio of 5:1 to 14:1; wherein the melt blended components further comprise benzoin; and wherein the melt-blended components comprise 75 to 85 weight percent of the poly(phenylene ether), 10 to 20 weight percent of the first hydrogenated block copolymer, 1 to 5 weight percent of the second hydrogenated block copolymer, and 0.3 to 0.6 weight percent of the benzoin.

Embodiment 18a

A composition comprising the product of melt blending components comprising: 75 to 85 weight percent of a poly(2,6-dimethyl-1,4-phenylene ether) having an intrinsic viscosity of 0.3 to 0.6 deciliter per gram, measured at 25° C. in chloroform; 10 to 20 weight percent of a polystyrene-poly(ethylene-butylene)-polystyrene triblock copolymer having a polystyrene content of 60 to 75 weight percent and a weight average molecular weight of 50,000 to 100,000 atomic mass units; 1 to 5 weight percent of a polystyrene-poly(ethylene-butylene-styrene)-polystyrene triblock copolymer having a polystyrene content of 50 to 65 weight percent and a weight average molecular weight of 200,000 to 400,000 atomic mass units, wherein the first hydrogenated block copolymer and the second hydrogenated block copolymer are present in a weight ratio of 5:1 to 14:1; and 0.3 to 6 weight percent of benzoin.

Embodiment 19

An article comprising the composition of any of embodiments 1-18 and 18a.

Embodiment 20

The article of embodiment 19, wherein the article is a container for refrigerated storage.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Materials and Methods

Table 1 summarizes the materials used in the working examples described below.

TABLE 1

| Component | Description |
|---|---|
| Antioxidant | Octadecyl 3,5-di-tert-butyl-4-hydroxyhydrocinnamate, CAS Reg. No. 2082-79-3; obtained as IRGANOX ™ 1076 from BASF. |
| Benzoin | 2-Hydroxy-1,2-diphenylethanone, CAS Reg. No. 119-5309; obtained from Aceto Corporation. |
| PPE 0.40 | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO ™ 640 Resin from SABIC Innovative Plastics. |
| PPE 0.46 | Poly(2,6-dimethyl-1,4-phenylene ether), CAS Reg. No. 24938-67-8, having an intrinsic viscosity of about |

TABLE 1-continued

| Component | Description |
|---|---|
| | 0.46 deciliter per gram as measured in chloroform at 25° C.; obtained as PPO ™ 646 Resin from SABIC Innovative Plastics. |
| RBC KK38 | Styrene-Butadiene Radial Block Copolymer, having a polystyrene content of about 68 weight percent and a melt flow rate of about 9 grams per 10 minutes measured at 200° C. and 5 kilograms load; obtained as K-RESIN ™ KK38 from Chevron Phillips. |
| S(EBS)S A1535 | Polystyrene-poly(ethylene-butylene-styrene)-polystyrene triblock copolymer having a polystyrene content of about 56-60 weight percent, a melt index less than 1 gram per 10 minutes measured at 230° C. and 5 kilogram load according to ASTM D1238, and a weight average molecular weight of about 260,000 atomic mass units; obtained as KRATON ™ A1535 from Kraton Performance Polymers Inc. |
| S(EBS)S A1536 | Polystyrene-poly(ethylene-butylene-styrene)-polystyrene triblock copolymer having a polystyrene content of about 37-44 weight percent, a melt index of about 7 grams per 10 minutes measured at 260° C. and 5 kilogram load according to ASTM D1238, and a weight average molecular weight of about 154,000 atomic mass units; obtained as KRATON ™ A1536 from Kraton Performance Polymers Inc. |
| S(EBS)S A1537 | Polystyrene-poly(ethylene-butylene-styrene)-polystyrene triblock copolymer having a polystyrene content of about 60 weight percent, a melt index of 5 gram per 10 minutes measured at 260° C. and 5 kilogram load according to ASTM D1238, and a weight average molecular weight of about 160,000 atomic mass units; obtained as KRATON ™ A1537 from Kraton Performance Polymers Inc. |
| S(EB)S G1650 | Polystyrene-poly(ethylene-butylene)-polystyrene triblock copolymer, CAS Reg. No. 66070-58-4, having a polystyrene content of about 28-31 weight percent and a weight average molecular weight of about 121,000 atomic mass units; obtained as KRATON ™ G1650 from Kraton Performance Polymers Inc. |
| S(EB)S G1651 | Polystyrene-poly(ethylene-butylene)-polystyrene triblock copolymer, CAS Reg. No. 66070-58-4, having a polystyrene content of about 30-33 weight percent and a weight average molecular weight of about 284,000 atomic mass units; obtained as KRATON ™ G1651 from Kraton Performance Polymers Inc. |
| S(EB)S G1652 | Polystyrene-poly(ethylene-butylene)-polystyrene triblock copolymer, CAS Reg. No. 66070-58-4, having a polystyrene content of about 28-30 weight percent and a weight average molecular weight of about 96,000 atomic mass units; obtained as KRATON ™ G1652 from Kraton Performance Polymers Inc. |
| S(EB)S H1043 | A polystyrene-poly(ethylene/butylene)-polystyrene triblock copolymer, CAS Reg. No. 66070-58-4, having a polystyrene content of 67 weight percent and a weight average molecular weight of about 73,000 atomic mass units; obtained as TUFTEC ™ H1043 from Asahi Chemical. |
| S(EB)S H1051 | A polystyrene-poly(ethylene/butylene)-polystyrene triblock copolymer, CAS Reg. No. 66070-58-4, having a polystyrene content of about 42 weight percent and a weight average molecular weight of about 92,000 atomic mass units; obtained as TUFTEC ™ H1051 from Asahi Chemical. |
| TBPP | Tris(2,4-di-tert-butylphenyl) phosphite, CAS Reg. No. 31570-04-4; obtained as IRGAFOS ™ 168 from BASF Corp. |

Compositions were compounded on a twin-screw extruder with 30 millimeter diameter screws operating at 300 rotations per minute and a throughput of about 19 kilograms/hour. All components were dry-blended before being added to the feed throat of the extruder. The extruder was operated with temperature zones of 240/270/290/290/290/290° C. from feed throat to die. The extrudate was water-cooled, pelletized, and dried for two hours at 100° C. in a vacuum oven before use for injection molding.

Test samples were injection molded on a 120T Van Dorn molder using barrel set points at 316° C. (600° F.) at an injection speed of 5.08 centimeters/second (2 inches/second).

Properties were determined according to ASTM protocols. Specifically, notched Izod impact strength values (expressed in units of joules/meter) were determined according to ASTM D 256-10 at 23° C. using a pendulum energy of 2 joules; values for 5 samples per composition were averaged. Multiaxial impact energy to failure values (expressed in units of joules) were determined at 23° C. and −20° C. according to ASTM D 3763-10 using a test speed of 3.3 meters per second and a sample thickness of 3.175 millimeters; values for 5-10 samples per composition were averaged. Heat deflection temperature values (expressed in degrees centigrade) were determined according to ASTM D 648-07 using a load of 1.82 megapascals and a sample thickness of 3.175 millimeters; values for 3 samples per composition were averaged. Melt volume flow rate values (expressed in cubic centimeters per ten minutes) were determined according to ASTM D 1238-10 at 300° C. and a 5 kilogram load; five measurements for one sample per composition were averaged.

Correlated haze values (expressed in units of percent), transmittance values (expressed in units of percent), and yellowness index values (unitless) were determined on 3.175 millimeter (0.125 inch) thick ASTM Dynatup disks and measured on a Gretag Macbeth Color-Eye™ 7000A spectrophotometer. The transmittance values correspond to Y tri-stimulus values for the 1931 CIE XYZ color space.

Examples 1-3, Comparative Examples 1-3

These examples illustrate variation in benzoin concentration as well as the presence and absence of the combination of a first hydrogenated block copolymer (generically HBC1, specifically S(EB)S H1043) and a second hydrogenated block copolymer of type (e) (generically HBC2e, specifically S(EB)S H1051). The results are summarized in Table 2, where "HBC1:HBC2" is the weight ratio of the first hydrogenated block copolymer to the second hydrogenated block copolymer. The results show Comparative Examples 1-3, lacking HBC1 and HBC2, were each deficient in low temperature impact strength, exhibiting −20° C. multiaxial impact energy to failure values below 20 joules. Comparative Example 1 was also deficient in transmittance, exhibiting a value less than 60%. Examples 2 and 3, containing benzoin, HBC1 and HBC2e, exhibited the desired combination of a correlated haze value no more than 20%, a transmittance value of at least 60%, and a −20° C. multiaxial impact energy to failure value of at least 20 joules. Example 1 met the criteria for correlated haze and −20° C. multiaxial impact energy to failure, and was extremely close to meeting the criterion for transmittance (59.5% versus 60%).

TABLE 2

| | C. Ex. 1 | C. Ex. 2 | C. Ex. 3 | Ex. 1 | Ex. 2 | Ex. 3 |
|---|---|---|---|---|---|---|
| COMPOSITIONS | | | | | | |
| PPE 0.40 | 100 | 99.7 | 99.4 | 86 | 85.6 | 85.2 |
| S(EB)S H1043 | 0 | 0 | 0 | 10 | 10 | 10 |
| S(EB)S H1051 | 0 | 0 | 0 | 4 | 4 | 4 |
| Benzoin | 0 | 0.3 | 0.6 | 0 | 0.4 | 0.8 |
| HBC1:HBC2 | 0:1 | 0:1 | 0:1 | 2.5:1 | 2.5:1 | 2.5:1 |

TABLE 2-continued

|  | C. Ex. 1 | C. Ex. 2 | C. Ex. 3 | Ex. 1 | Ex. 2 | Ex. 3 |
|---|---|---|---|---|---|---|
| PROPERTIES | | | | | | |
| Correlated haze (%) | 2.7 | 1.5 | 1.5 | 11.3 | 10.9 | 11.8 |
| Transmittance (%) | 58.4 | 74.9 | 78.8 | 59.5 | 68.9 | 70.0 |
| Yellowness Index | 99.3 | 78.0 | 68.8 | 101.2 | 81.0 | 77.5 |
| MAI EF 23° (J) | 41 | 56 | 56 | 41.7 | 36.6 | 35.4 |
| MAI EF −20° (J) | 13 | 15 | 18 | 23.6 | 31.5 | 28.6 |

Examples 4-8, Comparative Example 4

These examples illustrate the effects of benzoin concentration with three different impact modifiers. In Table 3, "n/a" means that the −20° C. multiaxial impact energy to failure was not measured due to the low value of the 23° C. multiaxial impact energy to failure. The results, summarized in Table 3, show that Comparative Example 4, with a combination of 12 weight percent of the HBC2e S(EB)S H1051 and 0.8 weight percent benzoin, exhibits a −20° C. multiaxial impact energy to failure value less than 20 joules. The remaining compositions, Examples 4-8, each exhibited the desired combination of a haze value no more than 20%, a transmittance value of at least 60%, and a −20° C. multiaxial impact energy to failure value of at least 20 joules.

TABLE 3

|  | Ex. 4 | Ex. 5 | Ex. 6 | C. Ex. 4 | Ex. 7 | Ex. 8 |
|---|---|---|---|---|---|---|
| COMPOSITIONS | | | | | | |
| PPE 0.40 | 57.6 | 59.6 | 59.6 | 57.2 | 59.2 | 59.2 |
| S(EB)S H1043 | 30 | 30 | 30 | 30 | 30 | 30 |
| S(EB)S H1051 | 12 | 0 | 0 | 12 | 0 | 0 |
| S(EB)S G1650 | 0 | 10 | 0 | 0 | 10 | 0 |
| S(EB)S G1652 | 0 | 0 | 10 | 0 | 0 | 10 |
| Benzoin | 0.4 | 0.4 | 0.4 | 0.8 | 0.8 | 0.8 |
| HBC1:HBC2 | 2.5:1 | 3:1 | 3:1 | 2.5:1 | 3:1 | 3:1 |
| PROPERTIES | | | | | | |
| Correlated haze (%) | 10.0 | 15.4 | 14.8 | 9.5 | 14.5 | 12.7 |
| Transmittance (%) | 76.0 | 69.1 | 70.3 | 77.1 | 70.8 | 73.4 |
| Yellowness Index | 61.6 | 71.6 | 70.6 | 57.1 | 67.2 | 63.5 |
| MAI EF 23° (J) | 51 | 53 | 59 | 12 | 60 | 50 |
| MAI EF −20° (J) | 60 | 62 | 66 | n/a | 69 | 66 |
| MVR (cc/10 min) | 24 | 18 | 21 | 28 | 20 | 25 |
| HDT (° C.) | 130 | 133 | 135 | 129 | 132 | 133 |

Examples 9 and 10, Comparative Example 5

These examples illustrate the effect of S(EB)S H1043 content. The results, summarized in Table 4, show that Comparative Example 5, with no HBC1 exhibits a high level of haze and a low level of transmittance. In contrast, Examples 9 and 10 with 5 and 10 weight percent, respectively, of the HBC1 S(EB)S H1043 exhibited the desired combination of a correlated haze value no more than 20%, a transmittance value of at least 60%, and a −20° C. multiaxial impact energy to failure value of at least 20 joules.

TABLE 4

|  | C. Ex. 5 | Ex. 9 | Ex. 10 |
|---|---|---|---|
| COMPOSITIONS | | | |
| PPE 0.40 | 95.6 | 90.6 | 85.6 |
| S(EB)S H1043 | 0 | 5 | 10 |
| S(EB)S H1051 | 4 | 4 | 4 |
| Benzoin | 0.4 | 0.4 | 0.4 |
| HBC1:HBC2 | — | 1.25:1 | 2.5:1 |
| PROPERTIES | | | |
| Correlated haze (%) | 56.4 | 16.5 | 10.9 |
| Transmittance (%) | 46.5 | 65.3 | 68.9 |
| Yellowness Index | 100.5 | 84.1 | 81.1 |
| MAI EF 23° (J) | 67 | 57 | 36.6 |
| MAI EF −20° (J) | 52.0 | 42.0 | 31.5 |

Examples 11-20, Comparative Examples 6 and 7

These examples illustrate the effects of varying contents and ratios of HBC1 and HBC2e. Note that Examples 11 and 12 are replicates, as are Examples 13 and 14, Examples 15 and 16, and Examples 17 and 18. The results, summarized in Table 5, show that the desired combination of a correlated haze value no more than 20%, a transmittance value of at least 60%, and a −20° C. multiaxial impact energy to failure value of at least 20 joules was exhibited by compositions in which the total of HBC1 and HBC2e contents was at least 6%, and the weight ratio of HBC1 to HBC2e was 1.7:1 to 20:1. Duplicate examples 13 and 14 are close to the edge of the formulation space in that Example 14 met all property criteria, but Example 13 was slightly deficient in −20° C. multiaxial energy to failure.

TABLE 5

|  | C. Ex. 6 | Ex. 11 | Ex. 12 | Ex. 13 | Ex. 14 | Ex. 15 |
|---|---|---|---|---|---|---|
| COMPOSITIONS | | | | | | |
| PPE 0.40 | 94.2 | 89.2 | 89.2 | 90.95 | 90.95 | 92.7 |
| S(EB)S H1043 | 5 | 10 | 10 | 7.5 | 7.5 | 5 |
| S(EB)S H1051 | 0.5 | 0.5 | 0.5 | 1.25 | 1.25 | 2 |
| Benzoin | 0.3 | 0.3 | 0.3 | 0.3 | 0.3 | 0.3 |
| HBC1:HBC2 | 10:1 | 20:1 | 20:1 | 6:1 | 6:1 | 2.5:1 |
| PROPERTIES | | | | | | |
| Correlated haze (%) | 13.2 | 2.4 | 2.3 | 3.7 | 3.3 | 5.9 |
| Transmittance (%) | 76.3 | 77.3 | 76.9 | 74.4 | 74.9 | 72.0 |
| Yellowness Index | 72.1 | 71.7 | 74.7 | 75.5 | 77.9 | 78.1 |
| MAI EF 23° (J) | 27 | 42 | 48 | 37 | 45 | 50 |
| MAI EF −20° (J) | 10 | 28 | 24 | 17 | 20 | 32 |

|  | Ex. 16 | Ex. 17 | Ex. 18 | Ex. 19 | C. Ex. 7 | Ex. 20 |
|---|---|---|---|---|---|---|
| COMPOSITIONS | | | | | | |
| PPE 0.40 | 92.7 | 87.7 | 87.7 | 88.2 | 88.7 | 83.7 |
| S(EB)S H1043 | 5 | 10 | 10 | 7.5 | 5 | 10 |
| S(EB)S H1051 | 2 | 2 | 2 | 4 | 6 | 6 |
| Benzoin | 0.3 | 0.3 | 0.3 | 0.3 | 0.3 | 0.3 |
| HBC1:HBC2 | 2.5:1 | 5:1 | 5:1 | 1.9:1 | 0.8:1 | 1.7:1 |
| PROPERTIES | | | | | | |
| Correlated haze (%) | 5.5 | 4.6 | 4.7 | 12.3 | 31.1 | 19.7 |
| Transmittance (%) | 71.1 | 74.6 | 73.4 | 66.7 | 56.5 | 62.2 |
| Yellowness Index | 82 | 74.4 | 79.6 | 86 | 94.9 | 90.9 |
| MAI EF 23° (J) | 69 | 32 | 52 | 61 | 57 | 54 |
| MAI EF −20° (J) | 47 | 35 | 37 | 38 | 53 | 47 |

Examples 21 and 22, Comparative Examples 8-10

These examples illustrate the effects of HBC1 content and HBC1 to HBC2e weight ratio. Example 22 is the same as Example 4. The results, summarized in Table 6, show that the desired combination of a correlated haze value no more than 20%, a transmittance value of at least 60%, and a −20° C. multiaxial impact energy value to failure of at least 20 joules was exhibited by compositions in which the weight ratio of HBC1 to HBC2e was greater than 1.1:1, and the sum of the HBC1 and HBC2e amounts was less than 46 weight percent.

TABLE 6

|  | Ex. 21 | C. Ex. 8 | Ex. 22 | C. Ex. 9 | C. Ex. 10 |
|---|---|---|---|---|---|
| COMPOSITIONS | | | | | |
| PPE 0.40 | 73.6 | 61.6 | 57.6 | 53.6 | 41.6 |
| S(EB)S H1043 | 20 | 20 | 30 | 40 | 40 |
| S(EB)S H1051 | 6 | 18 | 12 | 6 | 18 |
| Benzoin | 0.4 | 0.4 | 0.4 | 0.4 | 0.4 |
| HBC1:HBC2 | 3.3:1 | 1.1:1 | 2.5:1 | 6.7:1 | 2.2:1 |
| PROPERTIES | | | | | |
| Correlated haze (%) | 14 | 36 | 10 | 5.9 | 5.8 |
| Transmittance (%) | 70.5 | 59 | 76 | 82 | 83.3 |
| Yellowness Index | 72.1 | 81.6 | 61.6 | 50.9 | 43.4 |
| MAI EF 23° (J) | 26 | 57 | 51 | 8 | 11 |
| MAI EF −20° (J) | 36 | 68 | 60 | n/a | n/a |

Examples 23 and 24, Comparative Examples 11-14

These examples illustrate the effects of poly(phenylene ether) intrinsic viscosity, HBC1 content, HBC2d content, and HBC1 to HBC2d ratio. The results, summarized in Table 6, show that the desired combination of a correlated haze value no more than 20%, a transmittance value of at least 60%, and a −20° C. multiaxial impact energy to failure value of at least 20 joules was exhibited by compositions in which the weight ratio of HBC1 to HBC2 was greater than 1.9:1. Lower weight ratios were associated with undesirable haze and transmittance values (Comparative Examples 11-14). A change in poly(phenylene ether) intrinsic viscosity from 0.40 to 0.46 deciliter per gram had little effect on optical and ductile properties (Comparative Examples 11 and 12).

Examples 25-27, Comparative Examples 15 and 16

These examples further illustrate the effects of HBC1 content, HBC2d content, and HBC1:HBC2d ratio. The results, summarized in Table 8, show that the desired combination of a correlated haze value no more than 20%, a transmittance value of at least 60%, and a −20° C. multiaxial impact energy to failure value of at least 20 joules was exhibited by compositions in which the weight ratio of HBC1 to HBC2d was greater than 1.25:1 and less than 10:1. A higher weight ratio was associated with inadequate low temperature impact strength (Comparative Example 16), and a lower weight ratio was associated with undesirable haze and transmittance values (Comparative Example 15).

TABLE 8

|  | Ex. 25 | C. Ex. 15 | Ex. 26 | C. Ex. 16 | Ex. 27 |
|---|---|---|---|---|---|
| COMPOSITIONS | | | | | |
| PPE 0.46 | 75.6 | 63.6 | 59.6 | 55.6 | 43.6 |
| S(EB)S H1043 | 20 | 20 | 30 | 40 | 40 |
| S(EB)S G1650 | 4 | 16 | 10 | 4 | 16 |
| Benzoin | 0.4 | 0.4 | 0.4 | 0.4 | 0.4 |
| HBC1:HBC2 | 5:1 | 1.25:1 | 3:1 | 10:1 | 2.5:1 |
| PROPERTIES | | | | | |
| Correlated haze (%) | 12.0 | 65.5 | 15.4 | 4.1 | 6.9 |
| Transmittance (%) | 71.1 | 43.7 | 69.1 | 82.7 | 79 |
| Yellowness Index | 74.2 | 98.8 | 71.6 | 51.4 | 50.5 |
| MAI EF 23° (J) | 31 | 58 | 53 | 4 | 60 |
| MAI EF −20° (J) | 40 | 64 | 62 | n/a | 68 |

Example 28, Comparative Examples 17-21

These examples illustrate the effects of HBC1 content, HBC2d content, and HBC1 to HBC2d ratio. The results, summarized in Table 9, show that the desired combination of a correlated haze value no more than 20%, a transmittance value of at least 60%, and a −20° C. multiaxial impact energy to failure value of at least 20 joules was exhibited by compositions in which the HBC1 to HBC2d weight ratio was greater than 1.9:1 and less than 5:1.

TABLE 7

|  | Ex. 23 | Ex. 24 | C. Ex. 11 | C. Ex. 12 | C. Ex. 13 | C. Ex. 14 |
|---|---|---|---|---|---|---|
| COMPOSITIONS | | | | | | |
| PPE 0.40 | 92.6 | 87.6 | 88.1 | 0 | 88.6 | 83.6 |
| PPE 0.46 | 0 | 0 | 0 | 88.1 | 0 | 0 |
| S(EB)S H1043 | 5 | 10 | 7.5 | 7.5 | 5 | 10 |
| S(EB)S G1650 | 2 | 2 | 4 | 4 | 6 | 6 |
| Benzoin | 0.4 | 0.4 | 0.4 | 0.4 | 0.4 | 0.4 |
| HBC1:HBC2 | 2.5:1 | 5:1 | 1.9:1 | 1.9:1 | 0.8:1 | 1.7:1 |
| PROPERTIES | | | | | | |
| Correlated haze (%) | 11.7 | 7.7 | 25.4 | 31 | 63.3 | 37.9 |
| Transmittance (%) | 65.0 | 71.7 | 56.8 | 56.1 | 39.4 | 51.8 |
| Yellowness Index | 82.9 | 77.3 | 94.1 | 94.5 | 110.7 | 99.3 |
| MAI EF 23° (J) | 62 | 50 | 61 | 60 | 62 | 57 |
| MAI EF −20° (J) | 26 | 35 | 56 | 55 | 55 | 48 |

TABLE 9

|  | Ex. 28 | C. Ex. 17 | C. Ex. 18 | C. Ex. 19 | C. Ex. 20 | C. Ex. 21 |
|---|---|---|---|---|---|---|
| COMPOSITIONS | | | | | | |
| PPE 0.40 | 92.6 | 87.6 | 88.1 | 0 | 88.6 | 83.6 |
| PPE 0.46 | 0 | 0 | 0 | 88.1 | 0 | 0 |
| S(EB)S H1043 | 5 | 10 | 7.5 | 7.5 | 5 | 10 |
| S(EB)S G1652 | 2 | 2 | 4 | 4 | 6 | 6 |
| Benzoin | 0.4 | 0.4 | 0.4 | 0.4 | 0.4 | 0.4 |
| HBC1:HBC2 | 2.5:1 | 5:1 | 1.9:1 | 1.9:1 | 0.8:1 | 1.7:1 |
| PROPERTIES | | | | | | |
| Correlated haze (%) | 10.6 | 19 | 24.5 | 30.6 | 70.1 | 38.1 |
| Transmittance (%) | 67.3 | 70.7 | 59.9 | 58.1 | 39.8 | 53.6 |
| Yellowness Index | 83.4 | 80 | 90.7 | 92.3 | 109.2 | 96.4 |
| MAI EF 23° (J) | 53 | 31 | 61 | 65 | 61 | 62 |
| MAI EF −20° (J) | 29 | 12 | 38 | 51 | 56 | 49 |

Examples 29-31, Comparative Examples 22 and 23

These examples further illustrate the effects of HBC1 content, HBC2d content, and HBC1 to HBC2d ratio. The results, summarized in Table 10, show that the desired combination of a correlated haze value no more than 20%, a transmittance value of at least 60%, and a −20° C. multiaxial impact energy to failure value of at least 20 joules was exhibited by compositions in which the HBC1 to HBC2d weight ratio is greater than 1.25:1 and less than 10:1. A lower weight ratio was associated with undesirable haze and transmittance values (Comparative Example 22). A higher weight ratio was associated with inadequate low temperature impact strength (Comparative Example 24).

TABLE 10

|  | Ex. 29 | C. Ex. 22 | Ex. 30 | C. Ex. 23 | Ex. 31 |
|---|---|---|---|---|---|
| COMPOSITIONS | | | | | |
| PPE 0.40 | 75.6 | 63.6 | 59.6 | 55.6 | 43.6 |
| S(EB)S H1043 | 20 | 20 | 30 | 40 | 40 |
| S(EB)S G1652 | 4 | 16 | 10 | 4 | 16 |
| Benzoin | 0.4 | 0.4 | 0.4 | 0.4 | 0.4 |
| HBC1:HBC2 | 5:1 | 1.25:1 | 3:1 | 10:1 | 2.5:1 |
| PROPERTIES | | | | | |
| Correlated haze (%) | 11.6 | 64.5 | 14.8 | 3.7 | 5.4 |
| Transmittance (%) | 72.0 | 45.6 | 70.3 | 83.3 | 82.0 |
| Yellowness Index | 72.2 | 96.7 | 70.6 | 50.3 | 46.4 |
| MAI EF 23°(J) | 43 | 59 | 59 | 3 | 54 |
| MAI EF −20°(J) | 46 | 68 | 66 | n/a | 62 |

Comparative Examples 24-28

These examples illustrate the effect of a hydrogenated polystyrene-poly(ethylene-butylene)-polystyrene having a weight average molecular weight greater than 200,000 atomic mass units (that is, a hydrogenated block copolymer outside the scope of HBC2). The results, summarized in Table 11, show that none of the samples exhibited the desired combination of a correlated haze value no more than 20%, a transmittance value of at least 60%, and a −20° C. multiaxial impact energy to failure value of at least 20 joules.

TABLE 11

|  | C. Ex. 24 | C. Ex. 25 | C. Ex. 26 | C. Ex. 27 | C. Ex. 28 |
|---|---|---|---|---|---|
| COMPOSITIONS | | | | | |
| PPE 0.40 | 94.2 | 89.2 | 91.2 | 93.2 | 88.2 |
| S(EB)S H1043 | 5 | 10 | 7.5 | 5 | 10 |
| S(EB)S G1651 | 0.5 | 0.5 | 1 | 1.5 | 1.5 |
| Benzoin | 0.3 | 0.3 | 0.3 | 0.3 | 0.3 |
| HBC1:HBC2 | 10:1 | 20:1 | 7.5:1 | 3.3:1 | 6.7:1 |
| PROPERTIES | | | | | |
| Correlated haze (%) | 40.5 | 48.4 | 69.4 | 86.4 | 89.7 |
| Transmittance (%) | 61.1 | 62.6 | 50.8 | 39.0 | 43.1 |
| Yellowness Index | 86.4 | 86.3 | 95.7 | 106.3 | 102.7 |
| MAI EF 23°(J) | 58 | 59 | 64 | 62 | 59 |
| MAI EF −20°(J) | 19 | 25 | 41 | 39 | 40 |

Examples 32-39, Comparative Examples 29-31

These examples illustrate the effects of HBC1 content, HBC2a content, and HBC1 to HBC2a weight ratio. Examples 32 and 33 are replicates, as are Comparative Examples 30 and 31. The results, summarized in Table 12, show that the desired combination of a correlated haze value no more than 20%, a transmittance value of at least 60%, and a −20° C. multiaxial impact energy to failure value of at least 20 joules was exhibited by compositions in which the HBC1 to HBC2a weight ratio was greater than 0.7:1 and less than 20:1. A higher ratio was associated with inadequate low temperature impact strength (Comparative Example 29). A lower weight ratio was associated with elevated haze values (Comparative Examples 30 and 31).

TABLE 12

|  | Ex. 32 | Ex. 33 | Ex. 34 | C. Ex. 29 | Ex. 35 | Ex. 36 |
|---|---|---|---|---|---|---|
| COMPOSITIONS | | | | | | |
| PPE 0.40 | 93.6 | 93.6 | 86.1 | 78.6 | 86.85 | 79.35 |
| S(EB)S H1043 | 5 | 5 | 12.5 | 20 | 8.75 | 16.25 |
| S(EBS)S A1535 | 1 | 1 | 1 | 1 | 4 | 4 |
| Benzoin | 0.4 | 0.4 | 0.4 | 0.4 | 0.4 | 0.4 |
| HBC1:HBC2 | 5:1 | 5:1 | 12.5:1 | 20:1 | 2.2:1 | 4.1:1 |
| PROPERTIES | | | | | | |
| Correlated haze (%) | 4 | 4 | 4 | 5 | 10 | 9 |
| Transmittance (%) | 76 | 77 | 78 | 79 | 71 | 74 |
| Yellowness Index | 62 | 63 | 62 | 61 | 68 | 64 |

TABLE 12-continued

|  |  |  |  |  |  |  |
|---|---|---|---|---|---|---|
| MAI EF 23° (J) | 51 | 64 | 56 | 15 | 63 | 32 |
| MAI EF −20° (J) | 37 | 46 | 33 | n/a | 46 | 31 |
| MVR (cc/10 min) | 5.3 | 5.4 | 7.2 | 9.9 | 6.3 | 9.8 |
| HDT (° C.) | 174 | 176 | 164 | 153 | 170 | 155 |

|  | Ex. 37 | C. Ex. 30 | C. Ex. 31 | Ex. 38 | Ex. 39 |
|---|---|---|---|---|---|
| COMPOSITIONS | | | | | |
| PPE 0.40 | 75.6 | 87.6 | 87.6 | 80.1 | 72.6 |
| S(EB)S H1043 | 20 | 5 | 5 | 12.5 | 20 |
| S(EBS)S A1535 | 4 | 7 | 7 | 7 | 7 |
| Benzoin | 0.4 | 0.4 | 0.4 | 0.4 | 0.4 |
| HBC1:HBC2 | 5:1 | 0.7:1 | 0.7:1 | 1.8:1 | 2.9:1 |
| PROPERTIES | | | | | |
| Correlated haze (%) | 9 | 24 | 23 | 19 | 16 |
| Transmittance (%) | 74 | 60 | 60 | 66 | 70 |
| Yellowness Index | 64 | 75 | 76 | 70 | 66 |
| MAI EF 23° (J) | 35 | 60 | 62 | 57 | 53 |
| MAI EF −20° (J) | 49 | 50 | 59 | 50 | 57 |
| MVR (cc/10 min) | 11.9 | 6 | 5.7 | 8.3 | 12.2 |
| HDT (° C.) | 151 | 171 | 169 | 158 | 146 |

Examples 40-45, Comparative Examples 32-36

These examples illustrate the effects of HBC1 content, HBC2c content, and HBC1 to HBC2c weight ratio. Comparative Examples 33 and 34 are replicates. The results, summarized in Table 13, show that the desired combination of a correlated haze value no more than 20%, a transmittance value of at least 60%, and a −20° C. multiaxial impact energy to failure value of at least 20 joules was exhibited by compositions in which the HBC2c content was less than 7 weight percent, and the HBC1 to HBC2c ratio was less than 20:1. A HBC1 to HBC2c ratio of 20:1 was associated with inadequate low temperature impact strength (Comparative Example 33). And an HBC2c content of 7 weight percent was associated with elevated haze and inadequate transmittance (Comparative Examples 34-37).

TABLE 13

|  | Ex. 40 | Ex. 41 | Ex. 42 | C. Ex. 32 | Ex. 43 | Ex. 44 |
|---|---|---|---|---|---|---|
| COMPOSITIONS | | | | | | |
| PPE 0.40 | 93.6 | 93.6 | 86.1 | 78.6 | 86.85 | 79.35 |
| S(EB)S H1043 | 5 | 5 | 12.5 | 20 | 8.75 | 16.25 |
| S(EBS)S A1536 | 1 | 1 | 1 | 1 | 4 | 4 |
| Benzoin | 0.4 | 0.4 | 0.4 | 0.4 | 0.4 | 0.4 |
| HBC1:HBC2 | 5:1 | 5:1 | 12.5:1 | 20:1 | 2.2:1 | 4.1:1 |
| PROPERTIES | | | | | | |
| Correlated haze (%) | 4 | 4 | 5 | 5 | 20 | 14 |
| Transmittance (%) | 77 | 76 | 78 | 79 | 65 | 70 |
| Yellowness Index | 63 | 63 | 62 | 60 | 71 | 67 |
| MAI EF 23° (J) | 52 | 63 | 59 | 16 | 53 | 59 |
| MAI EF −20° (J) | 37 | 45 | 63 | n/a | 56 | 54 |
| MVR (cc/10 min) | 5.3 | 4.9 | 7.6 | 11.1 | 7.4 | 10.9 |
| HDT (° C.) | 177 | 172 | 163 | 154 | 169 | 157 |

|  | Ex. 45 | C. Ex. 33 | C. Ex. 34 | C. Ex. 35 | C. Ex. 36 |
|---|---|---|---|---|---|
| COMPOSITIONS | | | | | |
| PPE 0.40 | 75.6 | 87.6 | 87.6 | 80.1 | 72.6 |
| S(EB)S H1043 | 20 | 5 | 5 | 12.5 | 20 |
| S(EBS)S A1536 | 4 | 7 | 7 | 7 | 7 |
| Benzoin | 0.4 | 0.4 | 0.4 | 0.4 | 0.4 |
| HBC1:HBC2 | 5:1 | 0.7:1 | 0.7:1 | 1.8:1 | 2.9:1 |
| PROPERTIES | | | | | |
| Correlated haze (%) | 12 | 75 | 75 | 38 | 25 |
| Transmittance (%) | 73 | 40 | 41 | 56 | 64 |
| Yellowness Index | 64 | 83 | 83 | 75 | 70 |
| MAI EF 23° (J) | 54 | 57 | 64 | 63 | 59 |
| MAI EF −20° (J) | 48 | 60 | 66 | 62 | 65 |
| MVR (cc/10 min) | 11.7 | 6.8 | 7.4 | 10.4 | 11.1 |
| HDT (° C.) | 148 | 172 | 171 | 161 | 146 |

Examples 46-50, Comparative Example 38

These examples illustrate the effects of HBC2d content and HBC2a content. The results, summarized in Table 14, show that for the HBC2d S(EB)S G1650, the desired combination of a correlated haze value no more than 20%, a transmittance value of at least 60%, and a −20° C. multiaxial impact energy to failure value of at least 20 joules was exhibited for all samples, spanning HBC2d contents of 12 to 20 weight percent. For the HBC2a S(EBS)S A1535, the desired combination of a correlated haze value no more than 20%, a transmittance value of at least 60%, and a −20° C. multiaxial impact energy to failure value of at least 20 joules was exhibited for samples with an HBC2a content less than 20 weight percent, above which haze was elevated (Comparative Example 38).

TABLE 14

|  | Ex. 46 | Ex. 47 | Ex. 48 | Ex. 49 | Ex. 50 | C. Ex. 38 |
|---|---|---|---|---|---|---|
| COMPOSITIONS | | | | | | |
| PPE 0.40 | 57 | 43 | 29 | 57 | 43 | 29 |
| S(EB)S G1650 | 12 | 16 | 20 | 0 | 0 | 0 |
| S(EBS)S A1535 | 0 | 0 | 0 | 12 | 16 | 20 |
| S(EB)S H1043 | 30 | 40 | 50 | 30 | 40 | 50 |
| Benzoin | 1 | 1 | 1 | 1 | 1 | 1 |
| HBC1:HBC2 | 2.5:1 | 2.5:1 | 7.5:1 | 2.5:1 | 2.5:1 | 2.5:1 |
| PROPERTIES | | | | | | |
| Correlated haze (%) | 15 | 9.2 | 6.5 | 10.2 | 8.5 | 32 |
| Transmittance (%) | 65.3 | 75.8 | 81.3 | 71.9 | 75.7 | 79 |
| Yellowness Index | 63.7 | 44.2 | 31.6 | 55.1 | 45.1 | 33.9 |

TABLE 14-continued

|  | Ex. 46 | Ex. 47 | Ex. 48 | Ex. 49 | Ex. 50 | C. Ex. 38 |
|---|---|---|---|---|---|---|
| MAI EF 23° (J) | 56 | 53 | 48 | 54 | 54 | 45 |
| MAI EF −20° (J) | 59 | 58 | 54 | 59 | 59 | 47 |
| HDT (° C.) | 125 | 113 | 93.8 | 126 | 107 | 89.7 |

Examples 51-60, Comparative Examples 39-41

These examples illustrate the effects of HBC2 type. The results are summarized in Table 15. Example 52 is a replicate of Example 10. Example 56 is the same as Example 24. Comparative Example 39 is illustrative of the invention of U.S. Patent Application Publication No. US 2012/0308753 A1 of Balfour. It uses the HBC1 S(EB)S H1043 in combination with a radial block copolymer with unsaturated rubber (polybutadiene). The results show (1) that Comparative Example 39, illustrative of the prior art, was deficient in low-temperature ductility; (2) that Comparative Example 41 using the high molecular weight S(EB)S G1651 exhibited a high level of haze; (3) that Comparative Example 40, using an HBC content of 10 weight percent and an HBC1 to HBC2d (S(EB)S G1652) ratio of 5:1, was deficient in low-temperature ductility; and (4) that Examples 51-60 using the HBC2e S(EB)S H1051, the HBC2a S(EBS)S A1535, as well as the HBC2d S(EB)S 1652 at an HBC1 to HBC2d ratio of 2.5:1, exhibited the desired combination of a correlated haze value no more than 20%, a transmittance value of at least 60%, and a −20° C. multiaxial impact energy to failure value of at least 20 joules.

TABLE 15

|  | C. Ex. 39 | Ex. 51 | Ex. 52 | Ex. 53 | Ex. 54 | Ex. 55 |
|---|---|---|---|---|---|---|
| COMPOSITIONS | | | | | | |
| PPE 0.46 | 67.32 | 0 | 0 | 0 | 0 | 0 |
| PPE 0.40 | 0 | 87.6 | 85.6 | 92.6 | 75.6 | 92.6 |
| RBC KK38 | 18 | 0 | 0 | 0 | 0 | 0 |
| S(EB)S H1043 | 9 | 10 | 10 | 5 | 20 | 5 |
| S(EB)S H1051 | 0 | 2 | 4 | 2 | 4 | 0 |
| S(EB)S G1652 | 0 | 0 | 0 | 0 | 0 | 0 |
| S(EB)S G1650 | 0 | 0 | 0 | 0 | 0 | 2 |
| S(EB)S G1651 | 0 | 0 | 0 | 0 | 0 | 0 |
| S(EBS)S A1535 | 0 | 0 | 0 | 0 | 0 | 0 |
| Benzoin | 0.4 | 0.4 | 0.4 | 0.4 | 0.4 | 0.4 |
| Antioxidant | 0.25 | 0 | 0 | 0 | 0 | 0 |
| TBPP | 0.03 | 0 | 0 | 0 | 0 | 0 |
| HBC1:HBC2 | — | 5:1 | 2.5:1 | 2.5:1 | 5:1 | 2.5:1 |
| PROPERTIES | | | | | | |
| Notched Izod (J/m) | 50 | 50 | 50 | 50 | — | — |
| MAI EF 23° (J) | 20-40 | 26-52 | 40 | 50-70 | 40 | 62 |
| MAI EF −20° (J) | 5 | 27 | 28 | 38 | 30 | 26 |
| HDT (° C.) | 130 | 170 | 165 | 178 | 152 | 178 |
| MVR (cc/10 min) | 10 | 8.4 | 8.8 | 6 | 9 | — |
| Correlated haze (%) | 3-5 | 6 | 11 | 6 | 7 | 11.7 |
| Transmittance (%) | 80.0 | 74.0 | 70.0 | 72.0 | 72.0 | 65.0 |
| Yellowness Index | 60 | 76 | 81 | 78 | 74 | 83 |

|  | Ex. 56 | Ex. 57 | C. Ex. 40 | C. Ex. 41 | Ex. 58 | Ex. 59 |
|---|---|---|---|---|---|---|
| COMPOSITIONS | | | | | | |
| PPE 0.46 | 0 | 0 | 0 | 0 | 0 | 0 |
| PPE 0.40 | 87.6 | 92.6 | 87.6 | 89.2 | 80.48 | 81.46 |
| RBC KK38 | 0 | 0 | 0 | 0 | 0 | 0 |
| S(EB)S H1043 | 10 | 5 | 10 | 10 | 15.04 | 16.49 |
| S(EB)S H1051 | 0 | 0 | 0 | 0 | 0 | 0 |
| S(EB)S G1652 | 0 | 2 | 2 | 0 | 0 | 0 |
| S(EB)S G1650 | 2 | 0 | 0 | 0 | 0 | 0 |
| S(EB)S G1651 | 0 | 0 | 0 | 0.5 | 0 | 0 |

TABLE 15-continued

| | | | | | | |
|---|---|---|---|---|---|---|
| S(EBS)S A1535 | 0 | 0 | 0 | 0 | 4.07 | 1.65 |
| Benzoin | 0.4 | 0.4 | 0.4 | 0.4 | 0.41 | 0.4 |
| Antioxidant | 0 | 0 | 0 | 0 | 0 | 0 |
| TBPP | 0 | 0 | 0 | 0 | 0 | 0 |
| HBC1:HBC2 | 5:1 | 2.5:1 | 5:1 | 20:1 | 3.7:1 | 10:1 |
| PROPERTIES | | | | | | |
| Notched Izod (J/m) | — | — | — | 59 | — | — |
| MAI EF 23 (J) | 50 | 53 | 31 | 59 | 48 | 35 |
| MAI EF −20 (J) | 35 | 29 | 12 | 25 | 54 | 53 |
| HDT (° C.) | 171 | 178 | 171 | 170 | 156 | 149 |
| MVR (cc/10 min) | — | — | — | — | 12.5 | 11.6 |
| Correlated haze (%) | 7.7 | 10.6 | 19 | 49 | 8.3 | 4.6 |
| Transmittance (%) | 71.7 | 67.3 | 70.7 | 63.0 | 67.2 | 73.2 |
| Yellowness Index | 77 | 83 | 80 | 86 | 75.4 | 66.6 |

| | Ex. 60 |
|---|---|
| COMPOSITIONS | |
| PPE 0.46 | 0 |
| PPE 0.40 | 87.6 |
| RBC KK38 | 0 |
| S(EB)S H1043 | 9 |
| S(EB)S H1051 | 0 |
| S(EB)S G1652 | 0 |
| S(EB)S G1650 | 0 |
| S(EB)S G1651 | 0 |
| S(EBS)S A1535 | 3 |
| Benzoin | 0.4 |
| Antioxidant | 0 |
| TBPP | 0 |
| HBC1:HBC2 | 3:1 |
| PROPERTIES | |
| Notched Izod (J/m) | — |
| MAI EF 23 (J) | 74 |
| MAI EF −20 (J) | 59 |
| HDT (° C.) | 162 |
| MVR (cc/10 min) | 8.1 |
| Correlated haze (%) | 7.5 |
| Transmittance (%) | 67.3 |
| Yellowness Index | 75.7 |

Example 61, Comparative Examples 42-46

These examples illustrate the effect of HBC1 content, HBC2b content, and HBC1 to HBC2b weight ratio. The results show that Comparative Examples 42-45 with an HBC1 to HBC2b weight ratio of 5:1 or greater were each deficient in either or both of transmittance and −20° C. multiaxial impact energy to failure. Comparative Example 46 with an HBC1:HBC2b weight ratio of 3.8:1 but no $C_3$-$C_{24}$ alpha-hydroxyketone (benzoin) was deficient in transmittance. Example 61 with benzoin and an HBC1:HBC2b weight ratio of 3.8:1 exhibited the desired combination of a correlated haze value no more than 20%, a transmittance value of at least 60%, and a −20° C. multiaxial impact energy to failure value of at least 20 joules.

TABLE 16

| | C. Ex. 42 | C. Ex. 43 | C. Ex. 44 | C. Ex. 45 | C. Ex. 46 | Ex. 61 |
|---|---|---|---|---|---|---|
| COMPOSITIONS | | | | | | |
| PPE 0.46 | 76 | 75.6 | 79 | 78.6 | 81 | 80.6 |
| S(EBS)S A1537 | 4 | 4 | 1 | 1 | 4 | 4 |
| Benzoin | 0 | 0.4 | 0 | 0.4 | 0 | 0.4 |
| S(EB)S H1043 | 20 | 20 | 20 | 20 | 15 | 15 |
| HBC1:HBC2 | 5:1 | 5:1 | 20:1 | 20:1 | 3.8:1 | 3.8:1 |
| PROPERTIES | | | | | | |
| Correlated haze (%) | 13.3 | 12.8 | 9.9 | 9.9 | 11.8 | 12.1 |
| Transmittance (%) | 52.6 | 70.2 | 53.4 | 71.6 | 53.2 | 69.4 |
| Yellowness Index | 81.9 | 66.1 | 82 | 66.2 | 81.6 | 67.8 |
| MAI EF 23 (J) | 30 | 15 | 18 | 13 | 50 | 43 |
| MAI EF −20 (J) | 21 | 16 | 13 | 18 | 26 | 37 |

The invention claimed is:

1. A composition comprising the product of melt blending components comprising:
   29 to 95.5 weight percent of a poly(phenylene ether);
   4 to 50 weight percent of a first hydrogenated block copolymer (HBC1) comprising a polystyrene-poly(ethylene-butylene)-polystyrene triblock copolymer having a polystyrene content of 50 to 75 weight percent; and
   a second hydrogenated block (HBC2) copolymer comprising
   (HBC2a) 0.5 to 18 weight percent of a polystyrene-poly(ethylene-butylene-styrene)-polystyrene triblock copolymer having a polystyrene content of 50 to 65 weight percent and a weight average molecular weight of 200,000 to 400,000 atomic mass units, wherein the first hydrogenated block copolymer and the second hydrogenated block copolymer are present in a weight ratio of 1:1 to 15:1;

(HBC2b) 2 to 10 weight percent of a polystyrene-poly(ethylene-butylene-styrene)-polystyrene triblock copolymer having a polystyrene content of 55 to 65 weight percent and a weight average molecular weight of 100,000 to 190,000 atomic mass units, wherein the first hydrogenated block copolymer and the second hydrogenated block copolymer are present in a weight ratio of 2:1 to 4:1, and wherein the melt blended components further comprise 0.2 to 1.5 weight percent of a $C_3$-$C_{24}$ alpha-hydroxyketone;

(HBC2c) 1 to 5 weight percent of a polystyrene-poly(ethylene-butylene-styrene)-polystyrene triblock copolymer having a polystyrene content of 33 to 47 weight percent, wherein the second hydrogenated block copolymer and the first hydrogenated block copolymer are present in a weight ratio of 2:1 to 15:1;

(HBC2d) 1 to 20 weight percent of a polystyrene-poly(ethylene-butylene)-polystyrene triblock copolymer having a polystyrene content of 20 to 37 weight percent and a weight average molecular weight of 50,000 to 200,000 atomic mass units, wherein the second hydrogenated block copolymer and the first hydrogenated block copolymer are present in a weight ratio of 2:1 to 7:1, provided that when the first hydrogenated block copolymer amount is greater than or equal to 10 weight percent, the weight ratio of the second hydrogenated block copolymer and the first hydrogenated block copolymer is less than 5:1; or (HBC2e) 0.5 to 15 weight percent of a polystyrene-poly(ethylene-butylene)-polystyrene triblock copolymer having a polystyrene content of 38 to 48 weight percent, wherein the first hydrogenated block copolymer and the second hydrogenated block copolymer are present in a weight ratio of 1.25:1 to 25:1, wherein the melt blended components further comprise 0.2 to 0.7 weight percent of a $C_3$-$C_{24}$ alpha-hydroxyketone, provided that when the amount of the polystyrene-poly(ethylene-butylene)-polystyrene triblock copolymer having a polystyrene content of 38 to 48 weight percent is 0.5 weight percent, the amount of the first hydrogenated block copolymer is greater than 5 weight percent, and provided that the sum of the first hydrogenated block copolymer and the polystyrene-poly(ethylene-butylene)-polystyrene triblock copolymer having a polystyrene content of 38 to 48 weight percent is less than 46 weight percent;

wherein the melt blended components comprise 0 to 0.5 weight percent polyolefins;

provided that when the melt blended components comprise (HBC2b), the maximum amount of the poly(phenylene ether) is 94 weight percent; and provided that when the melt blended components comprise (HBC2c) or (HBC2d), the maximum amount of the poly(phenylene ether) is 95 weight percent.

2. The composition of claim 1, exhibiting a correlated haze value less than or equal to 20%, a transmittance value greater than or equal to 60%, and a −20° C. multiaxial impact energy to failure value greater than or equal to 20 joules, wherein correlated haze and transmittance are determined at a sample thickness of 3.175 millimeters.

3. The composition of claim 1, wherein the melt blended components further comprise 0.2 to 1.5 weight percent of the $C_3$-$C_{24}$ alpha-hydroxyketone when the second hydrogenated block copolymer comprises (HBC2a) the polystyrene-poly(ethylene-butylene-styrene)-polystyrene triblock copolymer having a polystyrene content of 50 to 65 weight percent and a weight average molecular weight of 200,000 to 400,000 atomic mass units, (HBC2c) the polystyrene-poly(ethylene-butylene-styrene)-polystyrene triblock copolymer having a polystyrene content of 33 to 47 weight percent, or (HBC2d) the polystyrene-poly(ethylene-butylene)-polystyrene triblock copolymer having a polystyrene content of 20 to 37 weight percent and a weight average molecular weight of 50,000 to 200,000 atomic mass units.

4. The composition of claim 1, wherein the melt blended components comprise 75 to 93 weight percent of the poly(phenylene ether).

5. The composition of claim 1, wherein the second hydrogenated block copolymer comprises (HBC2a) the polystyrene-poly(ethylene-butylene-styrene)-polystyrene triblock copolymer having a polystyrene content of 50 to 65 weight percent and a weight average molecular weight of 200,000 to 400,000 atomic mass units.

6. The composition of claim 1, wherein the second hydrogenated block copolymer comprises (HBC2b) the polystyrene-poly(ethylene-butylene-styrene)-polystyrene triblock copolymer having a polystyrene content of 55 to 65 weight percent and a weight average molecular weight of 100,000 to 190,000 atomic mass units.

7. The composition of claim 1, wherein the second hydrogenated block copolymer comprises (HBC2c) the polystyrene-poly(ethylene-butylene-styrene)-polystyrene triblock copolymer having a polystyrene content of 33 to 47 weight percent.

8. The composition of claim 1, wherein the second hydrogenated block copolymer comprises (HBC2d) the polystyrene-poly(ethylene-butylene)-polystyrene triblock copolymer having a polystyrene content of 20 to 37 weight percent and the weight average molecular weight of 50,000 to 200,000 atomic mass units.

9. The composition of claim 1, wherein the second hydrogenated block copolymer comprises (HBC2e) the polystyrene-poly(ethylene-butylene)-polystyrene triblock copolymer having a polystyrene content of 38 to 48 weight percent.

10. The composition of claim 1, wherein the first hydrogenated block copolymer has a weight average molecular weight of 50,000 to 200,000 atomic mass units.

11. The composition of claim 1, wherein the first hydrogenated block copolymer comprises 10 to 20 weight percent of the polystyrene-poly(ethylene-butylene)-polystyrene triblock copolymer having a polystyrene content of 50 to 75 weight percent, and has a weight average molecular weight of 50,000 to 100,000 atomic mass units.

12. The composition of claim 1, wherein the melt-blended components comprise 0 to 1 weight percent of ethylenically unsaturated rubber.

13. The composition of claim 1, wherein the melt-blended components comprise 0 to 2 weight percent of homopolystyrene.

14. The composition of claim 1, wherein the melt-blended components comprise 0 to 1 weight percent of radial block copolymers of an alkenyl aromatic monomer and a conjugated diene.

15. The composition of claim 1, wherein the melt-blended components comprise 0 to 1 weight percent of polystyrene-poly(ethylene-butylene)-polystyrene triblock copolymers having a weight average molecular weight greater than 200,000 atomic mass units.

16. The composition of claim 1, wherein the melt-blended components comprise 0 to 1 weight percent of hydrocarbon resins comprising aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, terpene resins, hydrogenated terpene resins, terpene-phenol resins, rosins, hydrogenated rosins, rosin esters, hydrogenated rosin esters, or a combination thereof.

17. The composition of claim 1, wherein the melt-blended components comprise 0 to 1 weight percent of organophosphate esters.

18. The composition of claim 1,
wherein the poly(phenylene ether) comprises a poly(2,6-dimethyl-1,4-phenylene ether) having an intrinsic viscosity of 0.3 to 0.6 deciliter per gram, measured at 25° C. in chloroform;
wherein the first hydrogenated block copolymer has a weight average molecular weight of 50,000 to 100,000 atomic mass units;
wherein the second hydrogenated block copolymer comprises the polystyrene-poly(ethylene-butylene-styrene)-polystyrene triblock copolymer having a polystyrene content of 50 to 65 weight percent and a weight average molecular weight of 200,000 to 400,000 atomic mass units, and the first hydrogenated block copolymer and the second hydrogenated block copolymer are present in a weight ratio of 5:1 to 14:1;
wherein the melt blended components further comprise benzoin; and
wherein the melt-blended components comprise
  75 to 85 weight percent of the poly(phenylene ether),
  10 to 20 weight percent of the first hydrogenated block copolymer,
  1 to 5 weight percent of the second hydrogenated block copolymer, and
  0.3 to 0.6 weight percent of the benzoin.

19. An article comprising the composition of claim 1.

20. The article of claim 19, wherein the article is a container for refrigerated storage.

* * * * *